Figure 3:
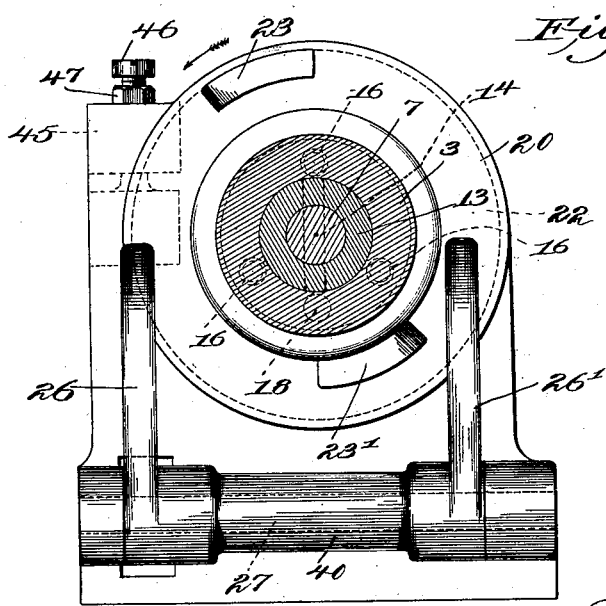

No. 694,550. Patented Mar. 4, 1902.
H. I. ILLINGWORTH.
CLUTCH.
(Application filed Aug. 26, 1901.)
(No Model.) 3 Sheets—Sheet 1.
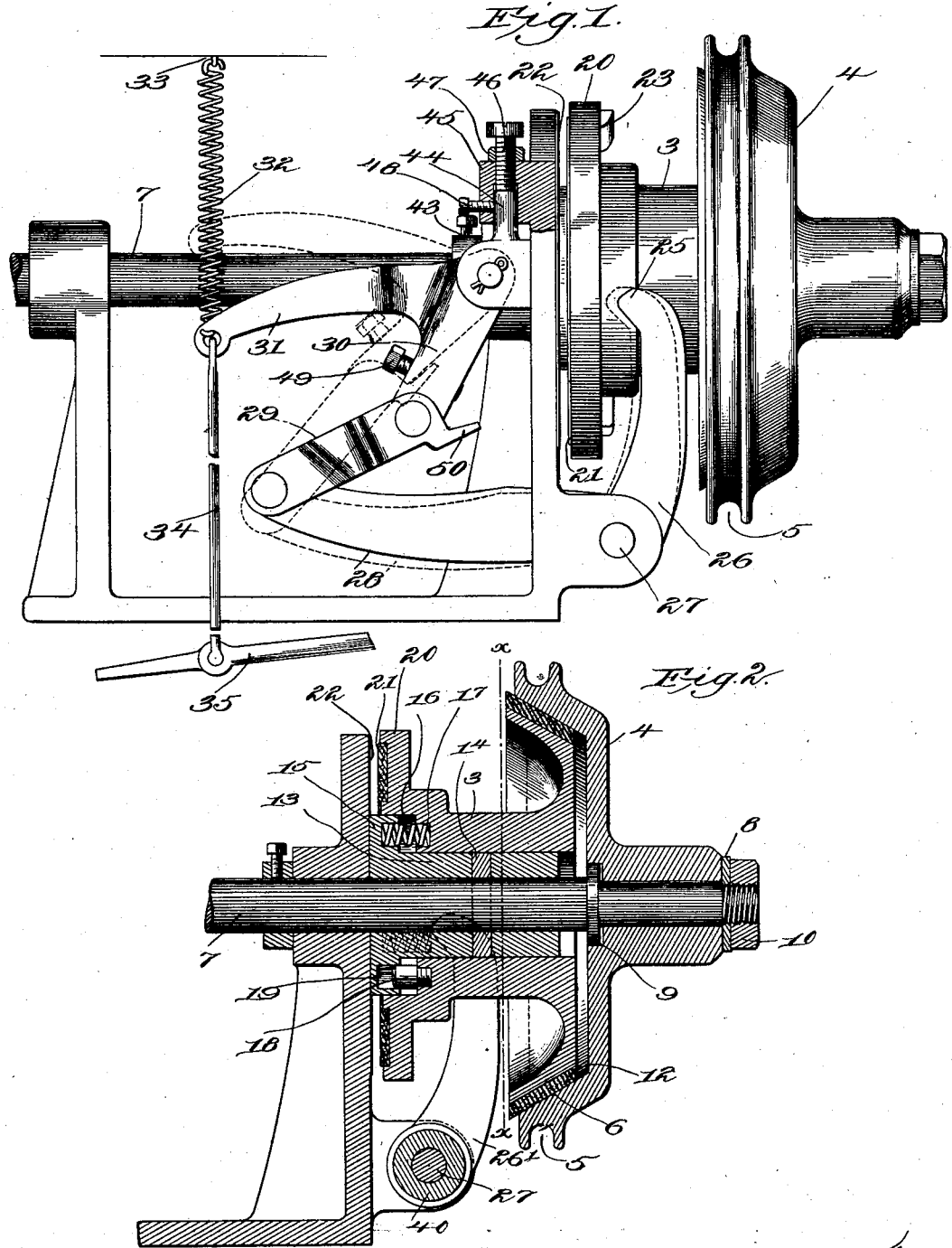
Witnesses.
Inventor.
Harry I. Illingworth No. 694,550. Patented Mar. 4, 1902.
H. I. ILLINGWORTH.
CLUTCH.
(Application filed Aug. 26, 1901.)
(No Model.) 3 Sheets—Sheet 2.

Witnesses.
W. C. Lunsford
A. B. Kaiser

Inventor.
Harry I. Illingworth
By Crosby & Gregory
Atty's.

THE NORRIS PETERS CO., PHOTO-LITHO., WASHINGTON, D. C.

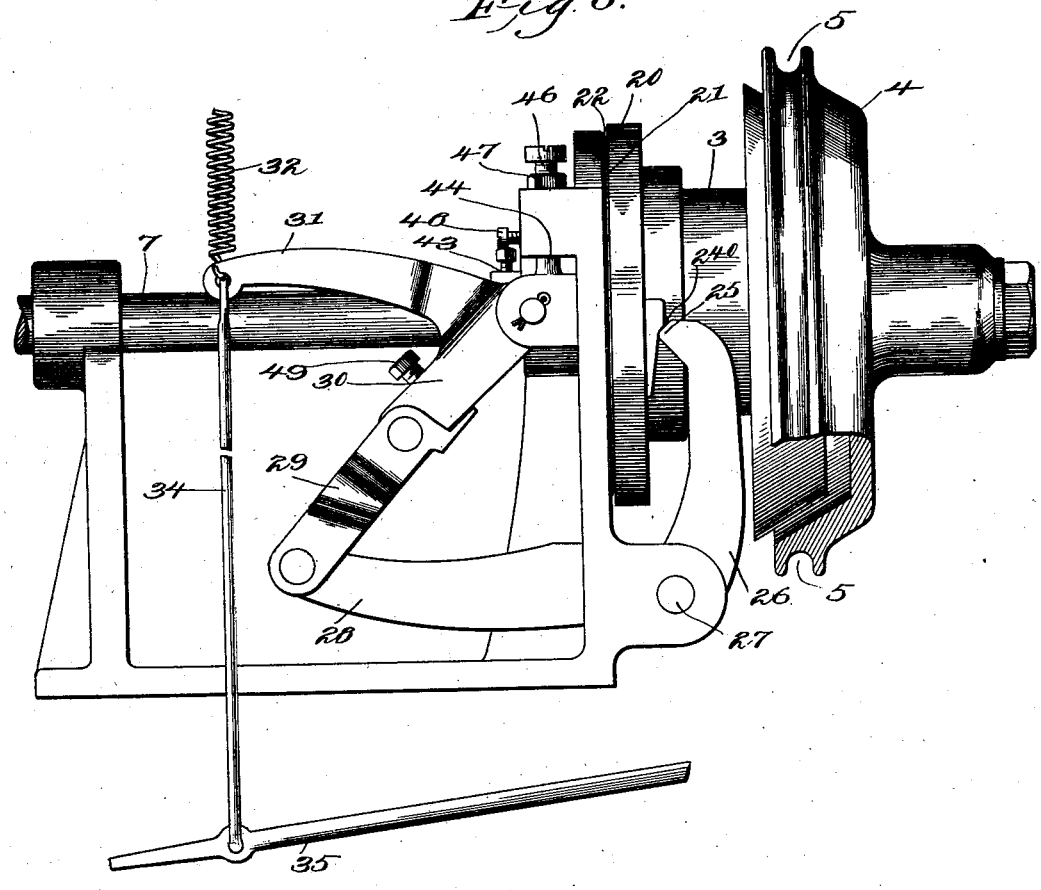

UNITED STATES PATENT OFFICE.

HARRY I. ILLINGWORTH, OF LYNN, MASSACHUSETTS, ASSIGNOR TO CHARLES E. RILEY, OF NEWTON, MASSACHUSETTS.

CLUTCH.

SPECIFICATION forming part of Letters Patent No. 694,550, dated March 4, 1902.

Application filed August 26, 1901. Serial No. 73,382. (No model.)

*To all whom it may concern:*

Be it known that I, HARRY I. ILLINGWORTH, a citizen of the United States, residing at Lynn, in the county of Essex and State of Massachusetts, have invented an Improvement in Clutches, of which the following description, in connection with the accompanying drawings, is a specification, like figures on the drawings representing like parts.
In certain classes of machinery—such as sewing-machines, nailing-machines, and similar devices—it is desirable to stop the machine at a certain predetermined point in the cycle of operations—for instance, in a sewing-machine with the needle raised and at its highest point and in a nailing-machine with the driver-bar raised and the machine ready to receive the work—and to accomplish this it has been customary to drive the mechanism by means of a clutch and provide a bunter or other positive stop to engage the driven clutch member or some moving part of the mechanism when the clutch members are disengaged in order to stop the mechanism at a predetermined point in the cycle of operations.

While the bunter or positive-stop device is applicable to light machines in which the momentum of the parts is comparatively small, practice has demonstrated that in heavy machines where the moving parts have considerable momentum such bunters or positive stops are impracticable because of the jar given to the machinery by such positive sudden stopping.
This invention has for its object to provide a simple inexpensive clutch device which comprises a minimum number of parts and which is especially adapted for use in driving machines where it is desired to stop the same at a predetermined point in the cycle of operations, which clutch device may include a friction-brake or stop device so constructed that when the brake is applied the driven clutch member will stop in a substantially predetermined angular position. The clutch comprises a driving and a driven clutch member which are normally in operative engagement with each other, the driven clutch member having a friction-brake surface which cooperates with a fixed friction-brake surface. Mechanism is used to disengage the clutch members when they reach a predetermined angular position and to move the driven member to bring its friction-brake surface into contact with the fixed friction-brake surface, such mechanism being so constructed that the friction created between the friction-brake surfaces operates to stop the driven member of the clutch in a substantially predetermined angular position. The clutch-disengaging mechanism, which also constitutes the brake-applying mechanism, includes a toggle or knuckle joint so constructed that when the toggle-joint is straightened the clutch-disengaging means is rendered active, and when the knuckle-joint is broken the said clutch-disengaging means is inoperative. Suitable mechanism, such as a spring, is used to automatically straighten said toggle or knuckle joint, and thus render the clutch-disengaging means operative, the action of said spring being controlled manually in some suitable way, as by a foot-treadle or hand-lever. Under normal conditions, therefore, the spring or other device automatically straightens the toggle-lever, thus rendering the clutch-disengaging means active, whereby the clutch members are disengaged and the brake is applied. When, however, it is desired to operate the mechanism to be driven, the manually-operated devices are manipulated to brake the toggle-lever, thus rendering the clutch-disengaging and brake-applying mechanism inactive and allowing the clutch members to be thrown into engagement, such condition continuing so long as the manually-operated devices are under control. As soon as the manually-operated devices are released the knuckle-joint is automatically straightened, the clutch members are disengaged, and the brake is applied as above described.

In the preferred embodiment of my invention the driven clutch member is carried by a sleeve mounted upon the shaft, and springs between the sleeve and clutch member operate to automatically throw said clutch members into engagement. The driven clutch member has wedge-shaped portions which are adapted to engage an abutment carried at the end of a lever pivoted to any suitable fixed support. The lever is turned about its fulcrum to throw the abutment into or out of operative position by means of a toggle or knuckle joint device so arranged that when the abutment is in operative position the levers or arms of the toggle or knuckle joint are straightened or in alinement, thereby serving to lock the abutment in its operative position. When the abutment is in its operative position the rotation of the clutch brings the wedge-shaped portion against the said abutment, thereby moving the driven clutch member longitudinally to disengage it from the driving clutch member and to bring its friction-brake surface against the fixed friction-brake surface to thereby stop the driven member, the parts being so constructed that the driven member will stop in substantially a predetermined angular position.

My improved clutch includes a minimum number of parts and is so constructed that it may be either mounted on a rotating or a fixed shaft, the clutch being what I would term a "self-contained" clutch.

Figure 4:
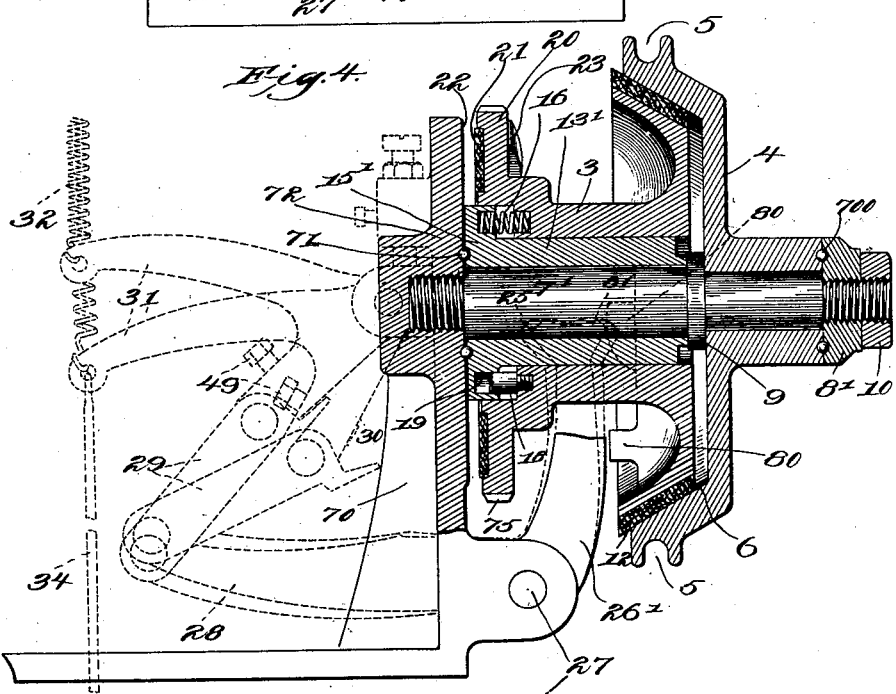
Figure 5:
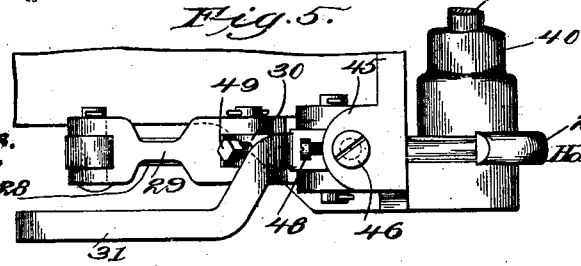

In the drawings, Figure 1 illustrates one form of my clutch in side elevation. Fig. 2 is a vertical central section. Fig. 3 is a section on the line $x\,x$, Fig. 2. Fig. 4 illustrates a modified form of my invention. Fig. 5 is a detail, to be hereinafter referred to; and Fig. 6 is a side view of my improved clutch with the clutch members disengaged.

The two clutch members are designated by 3 and 4, respectively, 4 being the driving clutch member and being provided with the usual conical friction-clutch surface 6 and having on its periphery a suitable groove 5 to receive the driving-band. The said driving clutch member is shown as rotatively mounted upon the shaft 7, but is held from longitudinal movement thereon by being confined between the washers 8 and 9, the said washers bearing against suitable shoulders on the shaft 7, and the washer 8 being held in position by means of a suitable nut 10.

In the embodiment of my invention illustrated in Figs. 1 and 2 the shaft 7 is a rotary shaft and is connected in any suitable way to the operative parts of the mechanism to be driven, and said shaft has mounted thereon to rotate therewith the driven clutch member 3, which is provided with a conical friction-surface 12, coöperating with the friction-surface 6. As illustrated, the driven clutch member 3 is carried by a suitable sleeve 13, which is made fast to the shaft 7 in any suitable way, preferably by means of the pin 14, passing through said sleeve and shaft. The sleeve 13 has at one end the flange 15, provided with sockets adapted to receive one end of a suitable spring 16, the other end of the spring being seated in a suitable socket 17 in the driven clutch member. A pin 18, made fast to the driven clutch member 3, is received in a suitable socket 19 in the flange of the sleeve 13, said pin operating to connect the sleeve and driven clutch member together for rotation, but allowing a relative longitudinal movement between the same. The springs 16, as will be readily understood, tend normally to move the driven clutch member 3 into engagement with the driving clutch member 4, so that under normal conditions the rotation of the driven clutch member is communicated to the mechanism to be operated.

The driven clutch member 3 is provided with the annular flange 20, having secured in any suitable way to its face an annular friction-ring 21, the said friction-ring being adapted to coöperate with a fixed friction-brake surface 22, carried by any suitable part of the mechanism, and when it is desired to stop the rotation of the mechanism the driven clutch member is disengaged from the driving clutch member 4, and the friction-brake surfaces 21 22 are brought into engagement, the mechanism for accomplishing this operating to bring the friction-brake surfaces into engagement with sufficient pressure to stop the rotation of the driven clutch member in substantially a predetermined angular position.

In the preferred embodiment of my invention I thus disengage the clutch members and apply the friction-brake by means of a movable clutch-disengaging member, which coöperates with a lug or projection upon the driven clutch member, one of said parts—that is, either the clutch-disengaging member or the lug or projection—having a cam construction whereby when the clutch-disengaging member is moved into the path of the projection the engagement of the projection with the clutch-disengaging member serves to give the driven clutch member a movement longitudinally of the shaft sufficient to disengage the same from the driving clutch member and to bring the friction-brake surfaces into contact.

In the drawings the movable-clutch-disengaging member is in the nature of a movable abutment 25, and the lug or projection on the driven clutch member is in the nature of a cam or wedge shaped projection 23. The abutment is mounted to be moved into and out of the path of the wedge-shaped projection 23, and when the said abutment is moved into the path of the projection, as shown in dotted lines, Fig. 1, which position of the abutment I have termed the "operative" position, the rotation of the clutch brings the wedge-shaped portion 23 against the said abutment, and the cam-like action between the projection 23 and the abutment serves to disengage and give the driven clutch member a movement longitudinally of the shaft, the momentum of the parts crowding the wedge-shaped portion between the abutment and the fixed friction-surface 22 with sufficient force to stop the driving clutch member at a substantially predetermined angular position.

The abutment 25 is carried upon one arm 26 of an elbow-lever fulcrumed, as at 27, to any suitable fixed support, the other arm 28 of said lever having connected thereto the arm 29 of a toggle or knuckle lever, the other arm, 30, of said knuckle-lever being pivoted, as hereinafter described, to a fixed support.

The construction of the knuckle-lever is such that when the lever is broken, as in the full-line position, Fig. 1, the arm 28 of the elbow-lever is raised and the abutment 25 is in its inoperative position, while when the toggle-joint is straightened—that is, the arms 29 30 thereof are in alinement—the abutment is thrown into its operative position. (Shown in dotted lines, Fig. 1.)

The toggle or knuckle joint is preferably so constructed that when the abutment 25 is in its operative position the arms thereof will have passed slightly by the dead-center until the lip or stop 50 on the arm 28 engages the arm 26, as shown in dotted lines, Fig. 1, whereby the abutment is locked in its operative position.

Extending from the arm 30 of the toggle-joint is an arm 31, having connected to the end thereof in any suitable way a spring or similar device 32, which is fastened to any suitable fixed support, as 33, the said spring tending normally to throw the toggle-joint into its straightened or locked position, as seen in dotted lines, Fig. 1, to bring the abutment into its operative position.

A suitable link 34, connected to the arm 31 and also the foot or hand lever 35, serves to throw the knuckle-joint into full-line position, Fig. 1, to thereby bring the abutment into its inoperative position.

It will thus be seen that the abutment-operating mechanism comprises automatic means for moving the abutment into its operative position, and manually-operated means to move said abutment into its inoperative position.

The operation of the parts will be readily understood from the above description, and is as follows: When it is desired to start the mechanism operated by the clutch, the manually-operated lever 35 is depressed to break the toggle-joint and throw the abutment from the dotted to the full line position, Fig. 1. The spring 16 then automatically operates to bring the clutch members into engagement, whereby the driven clutch member 3 is caused to rotate and the mechanism is operated. When it is desired to stop the mechanism, the manually-operated lever 35 is released and the spring 32 operates to automatically straighten the knuckle-joint and throw the same into the dotted-line position, Fig. 1, or the full-line position, Fig. 6, thereby bringing the abutment into and locking it in its operative position. As the clutch rotates the wedge-shaped portion 23 engages the abutment and operates to disengage the driven clutch member from the driving clutch member and to bring the friction-brake surfaces 21 22 into engagement, the said wedge-shaped portion being so constructed as to cause the driven clutch member to stop at a substantially predetermined angular position. My invention therefore in its broadest sense comprises a clutch-disengaging means, which includes a toggle or knuckle joint having automatic means to straighten the said toggle-joint and manually-operated means to break the same, the construction being such that when the toggle lever or joint is straightened the said clutch-disengaging means is rendered active, while when the said toggle-lever is broken the said clutch-disengaging means is rendered inactive. In this embodiment of my invention the clutch-disengaging means also constitutes a brake-applying means, so that when the clutch members are disengaged the brake is applied to stop the rotation of the driven clutch member at a substantially predetermined point.

I will preferably employ two abutments, one at each side of the clutch, in order that the friction-brake surface 21 may be brought squarely against the friction-brake surface 22. For this purpose the elbow-lever carrying the abutment is mounted on a shaft or pivot 27 and has the extended hub 40, through which the pivot 27 passes, (see Fig. 3,) and the end of said hub carries an arm 26' similar to the arm 26, said arm 26' carrying an abutment similar to the abutment 25. The arms 26 26' are situated different distances from the axis of rotation of the clutch, as seen in Fig. 3, and the flange 20 of the driving clutch member has a second wedge portion 23', situated so as to coöperate with the abutment on the arm 26'. The wedge portions are at different radial distances from the axis of the clutch and are so constructed that during the rotation of the clutch the abutment on the arm 26' will pass between the wedge 23 and the body of the driving clutch member, while the abutment on the arm 26 will pass outside of the wedge portion 23'. The said wedge-portions 23 23', however, are so situated that they simultaneously coöperate with their coöperating abutments on the arms 26 26'. After considerable use the abutments 25 or the wedge portion 23 would become worn to such an extent that the driven clutch member would not stop at the desired predetermined angular position, and to counteract this I preferably connect the arm 30 of the knuckle-joint to an adjustable pivot, whereby the operative position of the abutments 25 may be adjusted to compensate for such wear. As illustrated, the arm 30 of the knuckle-joint is pivoted to a suitable eye 43, having a stem 44, which projects into an aperture in an ear 45, secured to the frame of the machine, and adjusting-screw 46 is tapped into said ear and bears against the upper end of said screw 44, said adjusting-screw being held in position by any suitable locking-nut 47. A set-screw 48 may be used to hold the eye 43 from dropping out of the ear in any event. When either the abutment or the wedge portion 23 wears, the adjusting-screw 46 may be adjusted to lower the eye 43 slightly, to thereby rock the arms 26 and bring the abutment nearer the flange 20. I will preferably also provide the arm 30 of the knuckle-joint with the adjusting-screw 49, which passes through said arm and bears against the lip or projection 50 on the arm 29, whereby the distance that the pivotal point between the arms 29 and 30 is carried past the dead-center may be adjusted as wear occurs.

In the modification above described the stopping of the driven clutch member is accomplished entirely by the friction between the friction-surfaces 21 22, and while this construction will operate to stop the driven member at substantially a predetermined point in its rotation, yet a friction device cannot be relied upon to stop the said driven clutch member exactly at a predetermined point under all working conditions, for the friction necessary to bring the said driven clutch member to rest varies with the speed at which the clutch is running, the tension under which the machine is operating, and other conditions under which the machine is working. For instance, if the friction-brake device was so adjusted that it would bring the driven clutch member to rest at a certain predetermined point when the clutch was running at three hundred revolutions per minute it will be obvious that should the clutch make four hundred revolutions per minute the increased momentum of the parts would carry the said driven clutch member slightly by the predetermined point, or if the clutch were making less than three hundred the friction-brake would operate to stop the mechanism slightly in advance of the desired point. So, also, if the tension under which the machine is operating—that is, the resistance to the operation of the parts—varies such varying resistance will operate to vary the amount of friction necessary to bring the mechanism to rest, the resistance to be overcome aiding to a greater or less extent the friction-brake in bringing the mechanism to rest.

Other causes—such as varying temperatures, &c.—operate to render the action of a friction-brake unreliable in bringing the mechanism to rest at exactly a predetermined point under all conditions, and therefore when it is necessary that the parts should stop in exactly a predetermined point in the rotation of the clutch member under all conditions I may employ in addition to the friction-brake devices a positive stop, such as is illustrated in Fig. 6, wherein the wedge portion 23 is provided with a lip or projection 240, which is adapted to engage the abutment 25 and positively stop the driven clutch member at exactly a predetermined point in its rotation. In other respects the mechanism illustrated in Fig. 6 is similar to that shown in Figs. 1 and 2. In this embodiment of my invention the cam or inclined surface of the wedge portion 23 operates to bring the friction-surfaces together with a progressively-increased force, thereby nearly stopping the rotation of the driven clutch member, and when the predetermined point in the rotation of the clutch member is reached the lip 240 engages the end of the abutment 25 and positively stops the clutch member.

By using a combined friction and positive stop all of the jar and rack to the machinery incident to the use of a positive stop alone is avoided.

In the embodiments of my invention thus far described the driven clutch member is mounted for rotation with the shaft which drives the machinery. This construction, however, is not necessary, as my clutch is so constructed that both the driving and driven clutch members may be mounted for rotation upon the same stationary shaft or spindle, in which case the driven clutch member would be provided on its periphery with gear-teeth or other suitable driving connections for operating the machinery. This form of my invention is illustrated in Fig. 4, wherein a suitable stand 70 has secured thereto in any usual or suitable way a fixed non-rotary spindle or shaft 7', on which is mounted for rotation the driving clutch member 4, as in the other embodiment of my invention, said driving-clutch being held against longitudinal movement between the washers 9 and 8'. In this embodiment of my invention since the shaft 7' is non-rotary and the washer 8' also non-rotary I preferably provide suitable balls 700 between the hub of the driving clutch member and the washer 8' to reduce friction. The driven clutch member 3 is mounted upon the sleeve 13', as in the above-described embodiment of my invention, the said sleeve having the flange 15', between which and the clutch member 3 are the clutch-actuating springs 16, as above described. The clutch member 3 also carries the pin 18, the end of which is received in a suitable recess 19 in the sleeve 13', as above described. In this embodiment of my invention, however, the sleeve 13' is mounted for rotation upon the stationary or non-rotary spindle 7', and to reduce friction preferably I employ suitable ball-bearings 71 between the flange 15' and the plate 72, carrying the fixed friction-brake surface 22.

The driven clutch member 3 is provided on its periphery with suitable gear-teeth 75, said gear-teeth being shown as on the periphery of the flange 20 and being adapted to mesh with suitable gearing driving the mechanism to be operated. The abutments 25 for engaging the cam portions 23 on the movable clutch member and the knuckle or toggle joint for operating the abutments are the same in this embodiment of my invention as that illustrated in Figs. 1 and 2 and further description is not necessary.

In Figs. 1 and 2 I have illustrated manually-operated mechanism for throwing the abutment from its operative into its inoperative position, and with a clutch constructed as shown it is necessary to manually hold the abutment in its inoperative position so long as it is desired to have the clutch operate. It is sometimes desirable, however, to provide means for stopping the clutch after it has made one complete rotation, thus constituting what I have termed a "one-revolution" clutch.

When it is desired to use my invention as a one-revolution clutch, I provide means for automatically throwing the abutment 25 from its inoperative into its operative position when the clutch has made a partial rotation, so that when the rotation is complete the driven clutch member will be stopped. For this purpose the driven clutch member will be provided with a cam-lug 80, which is adapted to engage a nose or projection 81 upon the arm 26' of the elbow-lever, said cam 80 operating to throw the elbow-lever into position to bring the abutment into operative position. The cam 80 is so situated angularly that just before the wedge portion 23 comes opposite the abutment 25 the said cam 80 will engage the nose 81, as shown in dotted lines, Fig. 4, thereby throwing the abutment into its operative position and in position to be engaged by the wedge portion 23. The abutment is locked in its operative position by the knuckle-joint, as above described, and as the clutch continues its rotation the driven clutch member is stopped at a predetermined point, as above described.

From the above description it will be seen that I have devised a self-contained clutch device which may be used on a rotary or a stationary spindle or shaft, which is simple in construction, and which comprises but a few operative parts.

While I have herein illustrated and described the best manner of embodying my invention now known to me, yet I do not desire to be limited to the exact structure herein shown, as it will be obvious that other forms of clutches may be made to embody the essential features of my invention. Therefore believing that I am the first to employ in a clutch a clutch-disengaging mechanism which includes a toggle-joint so constructed that when the toggle is straightened the said clutch-disengaging means is rendered operative and when the toggle-joint is broken the said means is made inoperative and to provide manually-controlled means to break the toggle-joint and automatic means to straighten said joint when the manually-controlled means is released, I desire to claim the same broadly and would consider as coming within my invention any clutch embodying this construction. I would also state that my invention is not limited to a clutch including a friction-brake, as the toggle-joint feature of my invention could be used with clutch mechanisms which do not require to be stopped in a predetermined position.

Having described my invention, what I claim as new and desire to secure by Letters Patent, is—

1. In a clutch, a shaft, a driving and a driven clutch member mounted thereon, both of said clutch members being capable of having a movement independent of the shaft, means to bring said clutch members into engagement, a friction-brake for the driven clutch member, and means to disengage said clutch members and apply said friction-brake to the driven clutch member to stop the rotation of said driven clutch member in a substantially predetermined angular position.

2. In a clutch, a shaft, a driving and driven clutch member mounted thereon, means to bring said clutch members into engagement, a friction-brake adapted to coöperate with the driven clutch member, means tending normally to disengage the clutch members, said means operating to apply the friction-brake and stop the rotation of the driven clutch member in a substantially predetermined angular position, and manually-operated means to render said clutch-disengaging means inactive.

3. In a clutch, a driving and a driven clutch member, means inclosed within the clutch and tending normally to maintain said clutch members in engagement, a friction-brake adapted to coöperate with the driven clutch member, means to automatically disengage the clutch members, said means also operating to apply the friction-brake and stop the rotation of the driven clutch member in a substantially predetermined angular position.

4. In a clutch, a driving and a driven clutch member, means inclosed within the clutch and tending normally to maintain said clutch members in engagement, a friction-brake adapted to coöperate with the driven clutch member, means to automatically disengage the clutch members, said means also operating to apply the friction-brake and stop the rotation of the driven clutch member in a substantially predetermined angular position, and manually-operated means to render said automatic clutch-disengaging means inactive.

5. In a clutch, a driving and a driven clutch member, means to bring said clutch members into engagement, said driven clutch member having a cam projection and a friction-brake surface, a coöperating fixed friction-brake surface, and an abutment adapted to be moved into the path of the cam projection, whereby the driven clutch member is disengaged from the driving clutch member, and the brake-surfaces are brought together to stop the rotation of the said driven clutch member in a substantially predetermined angular position.

6. In a clutch, a driving and a driven clutch member, means tending normally to maintain said clutch members in engagement, said driven clutch member having a cam projection and a friction-brake surface, a coöperating fixed friction-brake surface, a movable abutment, means tending normally to maintain said abutment in the path of the cam projection, and manually-operated means to move said abutment out of the path of said cam projection, the construction being such that when the manually-operated means is inactive, the abutment is automatically made to engage said cam projection and thereby bring the brake-surfaces into contact to stop the rotation of the driven clutch member in a substantially predetermined angular position.

7. In a clutch, a shaft having a driving clutch member mounted for rotation thereon but held against longitudinal movement, a sleeve or thimble also mounted on said shaft, a driven clutch member mounted on the sleeve to rotate therewith but adapted to have a movement longitudinally thereof, springs between said sleeve and driven clutch member and tending normally to maintain the clutch members in engagement, combined with a manually-controlled means to disengage said clutch members.

8. In a clutch, a shaft having a driving clutch member loosely mounted thereon, a sleeve or thimble also mounted on said shaft, a driven clutch member mounted on the sleeve to rotate therewith but adapted to have a longitudinal movement thereon, springs between said sleeve and driven clutch member and tending normally to maintain the clutch members in engagement, a friction-brake surface on the driven clutch member, a coöperating fixed friction-brake surface, and manually-controlled means to move the driven clutch member longitudinally to disengage the clutch members and to bring the brake-surfaces into engagement to stop the driven clutch member in a predetermined angular position.

9. In a clutch, a driving clutch member and a driven clutch member, one of said clutch members having an annular friction-surface and the other of said clutch members having a coöperating friction-surface, means tending normally to throw said members into engagement, and mechanism including a knuckle-joint to disengage said members.

10. In a clutch, a driving and a driven member, means tending normally to maintain said members in engagement, an abutment, and means to move said abutment into its operative position in engagement with the driven clutch member to disengage said clutch members, said means including a knuckle-joint, the construction being such that when the abutment is in its operative position the knuckle-joint is straightened thereby locking the abutment in such position.

11. In a clutch, a driving and a driven clutch member, means to bring said clutch members into engagement, said driven clutch member having a cam projection and a friction-brake surface, a coöperating fixed friction-brake surface, a movable abutment, automatic mechanism including a knuckle-joint to move said abutment into its operative position in the path of the cam projection, the knuckle-joint being straightened when the abutment is in its operative position, thereby locking the latter in such position, and the abutment when engaged by the cam projection operating to force the friction-brake surfaces together to stop the rotation of the driven clutch member in a predetermined angular position.

12. In a clutch, a driving clutch member and a driven clutch member, one of said members having an annular clutch-surface, and the other of said members having a coöperating clutch-surface, a friction-brake adapted to coöperate with the driven clutch member, means to apply the brake and stop the rotation of said driven clutch member at a substantially predetermined point, said means including a knuckle-joint.

13. In a clutch, a driving clutch member and a driven clutch member, said members having coöperating conical friction-surfaces, a friction-brake adapted to coöperate with the driven clutch member, means to apply the brake and stop the rotation of said driven clutch member at a substantially predetermined point, said means including a knuckle-joint.

14. In a clutch, a driving clutch member and a driven clutch member, said members having coöperating friction-clutch surfaces, one of said members having a movement longitudinally of the shaft, a friction-brake adapted to coöperate with the driven clutch member, means to apply the brake and stop the rotation of said driven clutch member at a substantially predetermined point, said means including a knuckle-joint.

15. In a clutch, a driving clutch member, and a coöperating driven clutch member, one of said members having an annular friction-clutch surface, and the other of said members having a coöperating friction-clutch surface, means to bring said clutch-surfaces into engagement, clutch-disengaging means comprising a knuckle-joint, means tending normally to straighten said knuckle-joint, and manually-operated means to break said joint, the construction being such that when the knuckle-joint is straightened, the clutch-disengaging means is rendered active, and when the knuckle-joint is broken the clutch-disengaging means is inactive.

16. In a clutch, a driving clutch member having an annular friction-surface, and a driven clutch member having a coöperating friction-surface, means tending normally to throw said clutch members into engagement, a friction-brake, and means to disengage said clutch members and apply the brake, said means comprising a knuckle-joint, means tending normally to straighten said knuckle-joint, and manually-operated means to break the same, the construction being such that when the knuckle-joint is straightened, the means for disengaging the clutch members and applying the brake is rendered active, and when the knuckle-joint is broken, said means is rendered inactive.

17. In a clutch, a driving clutch member and a driven clutch member, said driven clutch member having a friction-brake surface, a coöperating friction-brake surface, and positive mechanism for disengaging said clutch members when said clutch members reach a predetermined angular position, said positive mechanism also operating to bring the friction-brake surfaces into contact with sufficient force to cause the driven clutch member to come to rest substantially in a predetermined angular position, said positive mechanism being operated independently of the rotation of the clutch.

18. In a clutch, a driving clutch member and a driven clutch member, means to disengage said clutch members, a friction-brake independent from said clutch-disengaging means, and a positive stop for the driven clutch member.

19. In a clutch, a driving clutch member and a driven clutch member, means to disengage said clutch members, and means to bring the driven clutch member to rest in a predetermined angular position, said means including a friction-brake and a positive stop.

20. In a clutch, a driving clutch member and a driven clutch member, a friction-brake coöperating with the driven clutch member, means to disengage the said clutch members, said means operating to apply the friction-brake subsequently to the disengagement of the clutch members, and a positive stop for the driven clutch member.

21. In a clutch, a shaft, a driving clutch member mounted thereon and having an annular friction-clutch surface, a driven clutch member also mounted on said shaft and having a coöperating friction-clutch surface, means to bring said clutch-surfaces into engagement, a friction-brake for the driven clutch member, and means to disengage said clutch-surfaces and apply said friction-brake to the driven clutch member, to stop the rotation of said driven clutch member in a substantially predetermined angular position.

22. In a clutch, a shaft, a driving and a driven clutch member mounted thereon and each having a movement independent of the shaft, means tending normally to throw said members into engagement, and mechanism including a knuckle-joint to disengage said members.

23. In a clutch, a shaft, a driving and a driven clutch member mounted thereon, said driving clutch member having a rotary movement independent of the shaft, and the driven clutch member having a movement longitudinally of the shaft, a friction-brake adapted to coöperate with the driven clutch member, means to apply the brake and stop the rotation of the driven clutch member at a substantially predetermined point, said means including a knuckle-joint.

24. In a clutch, a shaft, a driving and a driven clutch member mounted thereon, said driving clutch member being loosely mounted on the shaft, and the driven clutch member having a movement longitudinally of the shaft, means to bring said clutch members into engagement, and clutch-disengaging means comprising a knuckle-joint, means tending normally to straighten said knuckle-joint, and manually-operated means to break said joint, the construction being such that when the knuckle-joint is straightened, the clutch-disengaging means is rendered active, and when the knuckle-joint is broken said clutch-disengaging means are inactive.

25. In a clutch, a shaft, a driving and a driven clutch member mounted thereon, each of said members having a movement independent of the shaft, means tending normally to throw said clutch members into engagement, a friction-brake, and means to disengage said clutch members and apply the brake, said means comprising a knuckle-joint, means tending normally to straighten said knuckle-joint, and manually-operated means to break the same, the construction being such that when the knuckle-joint is straightened, the means for disengaging the clutch members and applying the brake is rendered active, and when the knuckle-joint is broken, said means is rendered inactive.

In testimony whereof I have signed my name to this specification in the presence of two subscribing witnesses.

HARRY I. ILLINGWORTH.

Witnesses:
LOUIS C. SMITH,
GEO. H. MAXWELL.